(12) United States Patent
Nishidate et al.

(10) Patent No.: US 7,668,048 B2
(45) Date of Patent: Feb. 23, 2010

(54) OPTICAL HEAD AND OPTICAL DISC DEVICE PROVIDED THEREWITH

(75) Inventors: Tetsuo Nishidate, Daito (JP); Takayuki Murakami, Daito (JP); Ryotaro Nakagawa, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 712 days.

(21) Appl. No.: 11/366,525

(22) Filed: Mar. 3, 2006

(65) Prior Publication Data

US 2006/0198255 A1 Sep. 7, 2006

(30) Foreign Application Priority Data

Mar. 3, 2005 (JP) .............................. 2005-058283

(51) Int. Cl.
*G11B 7/00* (2006.01)
(52) U.S. Cl. .................................... 369/44.14
(58) Field of Classification Search ........................ None
See application file for complete search history.

(56) References Cited

U.S. PATENT DOCUMENTS 7,206,273 B2 * 4/2007 Sogawa et al. ............... 369/100

| 2002/0021631 | A1 | 2/2002 | Yokohama et al. |
| 2004/0081062 | A1 | 4/2004 | Netsu et al. |
| 2004/0095869 | A1 | 5/2004 | Yoshizawa |
| 2004/0103421 | A1 | 5/2004 | Nakata et al. |
| 2005/0015790 | A1 | 1/2005 | Yoshizawa |
| 2005/0141358 | A1 * | 6/2005 | Kim ........................ 369/44.15 |

FOREIGN PATENT DOCUMENTS

| EP | 0649130 | 4/1995 |
| JP | 2002042373 A * | 2/2002 |
| JP | A-2002-042373 | 2/2002 |

* cited by examiner

*Primary Examiner*—Thang V Tran
*Assistant Examiner*—Adam R Giesy
(74) *Attorney, Agent, or Firm*—Morgan Lewis & Bockius LLP (57) ABSTRACT

In an optical head according to the present invention, an act base on which an objective lens is arranged is formed in a rectangular shape with through holes formed in four corners thereof. A base on which a collimating lens is arranged has projections to engage with the through holes in correspondence with the through holes when the act base is arranged. With the through holes of the act base engaged with the projections of the base, an adhesive is injected to the through holes to thereby fix the act base to the base. This improves the accuracy in bonding between the base and the act base, and permits laser light of a more stable intensity accordingly to be irradiated to the optical disc, thus permitting suppressing failure involved in data recording or reading.

6 Claims, 8 Drawing Sheets

Prior Art

OPTICAL HEAD AND OPTICAL DISC DEVICE PROVIDED THEREWITH

This application is based on Japanese Patent Application No. 2005-058283 filed on Mar. 3, 2005, the contents of which are hereby incorporated by reference.

BACKGROUND OF THE INVENTION

1. Field of the Invention

The present invention relates to an optical disc device capable of performing data recording or reading by irradiating an optical disc with light, and more specifically, to an optical head that irradiates the optical disc with light.

2. Description of the Prior Art

In recent years, as a recording medium for data such as pictures and sounds, optical discs have been widely used which are capable of performing data recording or reading by being irradiated with light. As the optical disc, a CD (compact disc), a DVD (digital versatile disc), and the like are widely used. An optical disc device, which performs data recording or reading on this optical disc as a recording medium, includes an optical head that irradiates the recording surface of the optical disc with laser light and that detects the light reflected therefrom.

Figure 6:
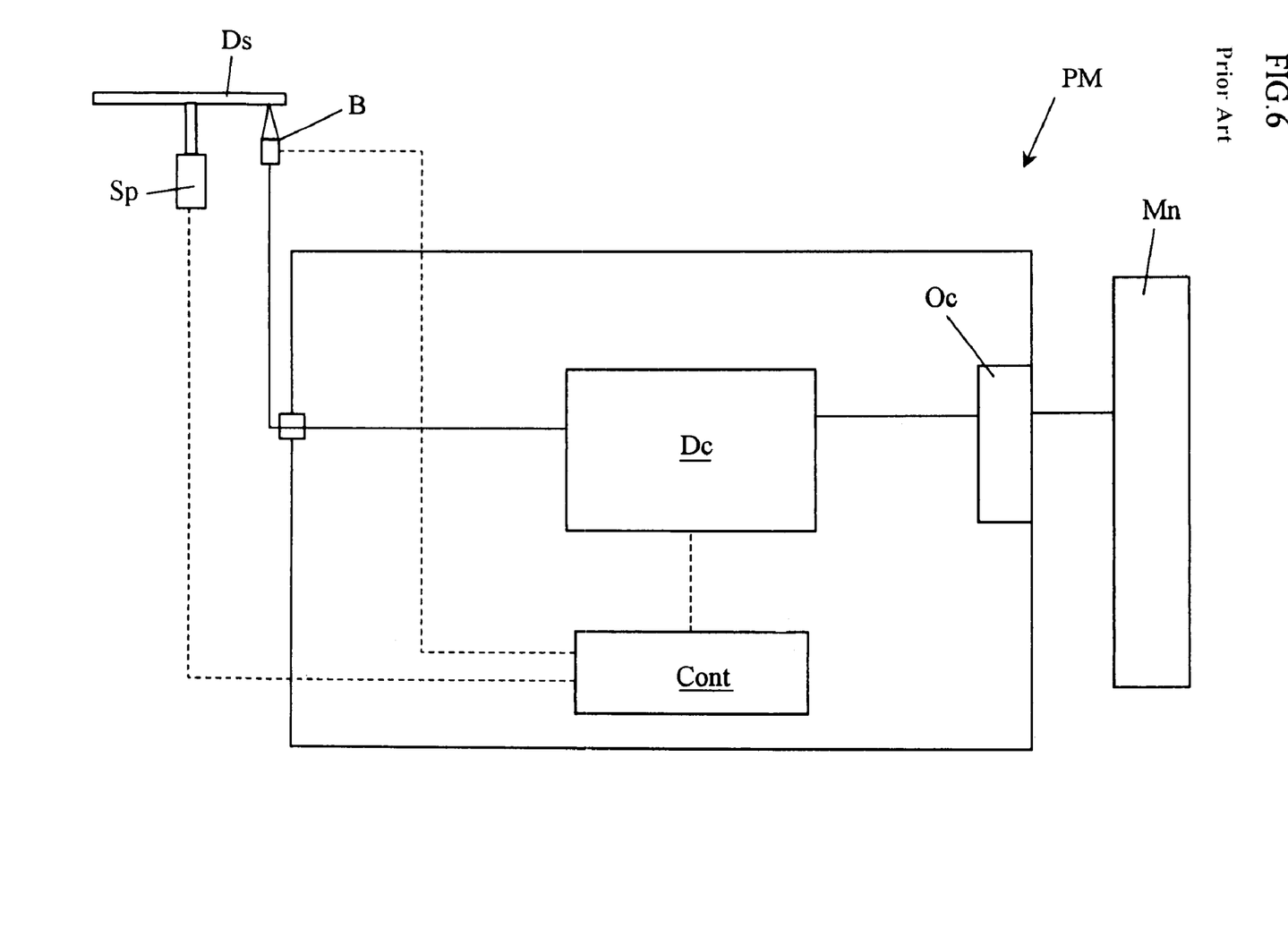
FIG. 6 is a schematic layout drawing of one example of a conventional optical disc device.

FIG. 6 is a schematic layout drawing of a DVD player as one example of a conventional optical disc device. The DVD player PM shown in FIG. 6 includes: a spindle motor Sp that rotates a DVD media Ds; an optical head B that irradiates the surface of the DVD media Ds with laser light and then detects the light reflected therefrom; a decoder Dc that decodes a signal detected by the optical head B; an external connector Oc that makes connection with an external monitor Mn; and a controller Cont.

First, the controller Cont drives the spindle motor Sp to thereby rotate the DVD media Ds. The optical head B irradiates the DVD media Ds in rotation with laser light, and then detects the light reflected therefrom. The light detected by the optical head B is transmitted as an electrical signal to the decoder Dc, where the signal is demodulated into a picture signal and then is transmitted to the monitor Mn, whereby the picture is displayed on the monitor Mn.

Figure 2:
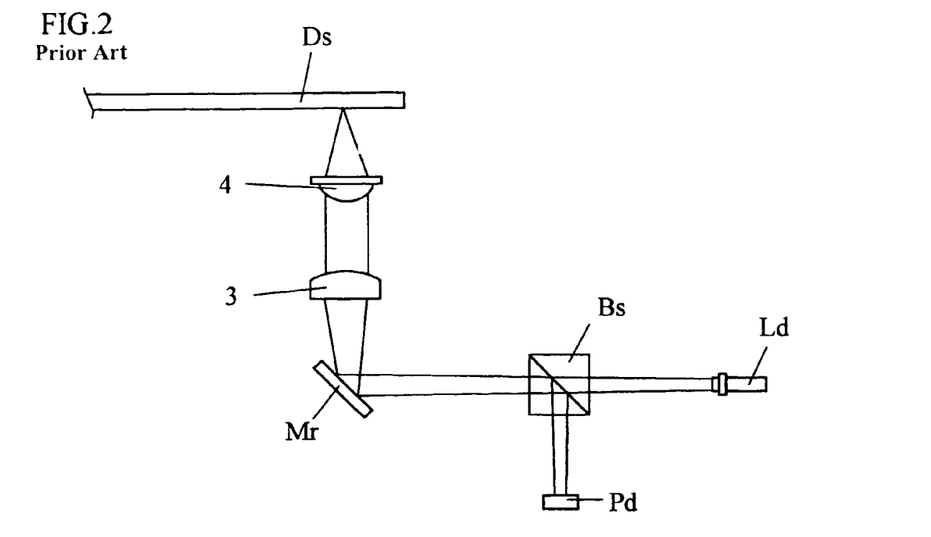
FIG. 2 is a layout drawing of one example of an optical head.

FIG. 2 shows a layout drawing of the optical head. The optical head has, as shown in FIG. 2, a laser light source Ld, a mirror Mr, a collimating lens 3, an objective lens 4, a beam splitter Bs, and a light receiving element Pd. Laser light emitted from the laser light source Ld is reflected on the mirror Mr and then enters the collimating lens 3. The laser light entering the collimating lens 3 then emerges therefrom as parallel light and then enters the objective lens 4. The laser light entering the objective lens 4 is irradiated to the recording surface of the DVD media Ds.

At this point, the laser light is irradiated, focusing on a recording layer of the DVD media Ds, so that the optical axis and the recording layer of the DVD media Ds become perpendicular to each other. The beam splitter Bs is a prism that transmits half of incident laser light therethrough and reflects half of the incident laser light and that guides light reflected on the DVD media Ds to the light receiving element Pd. The light receiving element Pd converts light into a current, and reads data based on the intensity of light.

Figure 7:
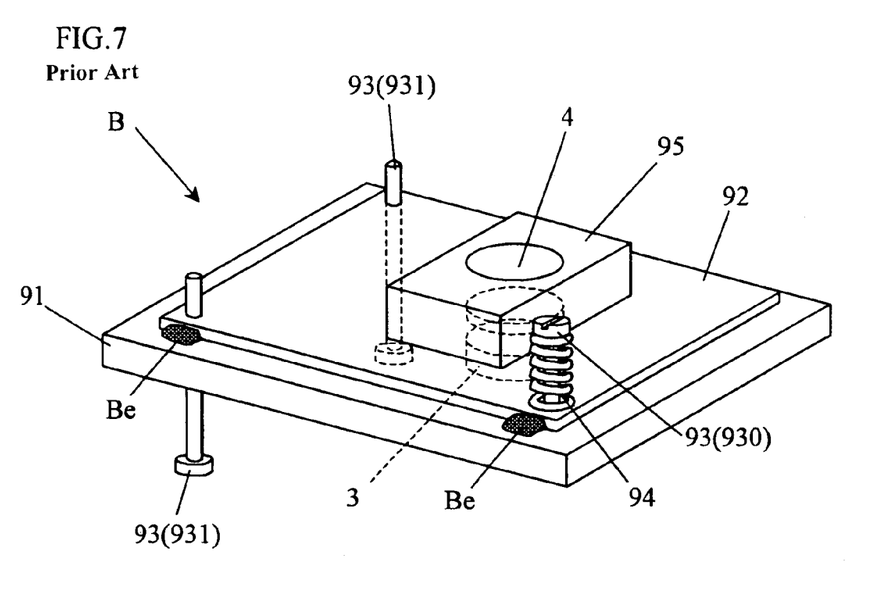
FIG. 7 is a perspective view of a conventional optical head.
Figure 8:
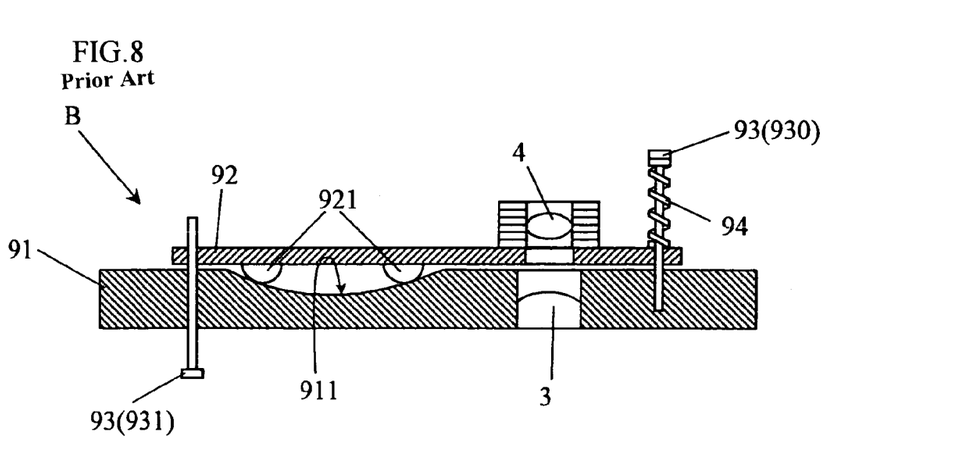
FIG. 8 is a sectional view of the conventional optical head.

FIG. 7 is a perspective view of a conventional optical head, and FIG. 8 is a sectional view thereof. As shown in FIG. 7, the optical head B has a base 91 for fitting the collimating lens 3, and an actuator base 92 (hereinafter indicated as act base) which is fitted to the base 91 and on which the objective lens 4 is arranged. As shown in FIG. 7, the act base 92 is fixed to the base 91 with three sections thereof screwed with, but not limited to, screws 93 in this embodiment. Considering the symmetry property, one of the screws 93 for fixing the act base 92 is fitted with a spring 94. The act base 92 is always biased by the spring 94. The objective lens 4 is so arranged by being fitted to a lens fitting part 95, which is then fitted to the act base 92.

As shown in the sectional view of FIG. 8, in the base 91, a large truncated spherical recession 911 is formed. On the act base 92, the projections 921, not limited to but three in quantity in this embodiment, are formed which are cut into a spherical shape. The curved surface of this projection 921 is arranged in contact with the curved surface of the recession 911. As shown in FIG. 8, by tightening and loosening the screw 93, the curved surface of the projection 921 moves while making contact with the curved surface of the recession 911, whereby the act base 92 smoothly changes its tilt state with respect to the base 91.

The act base 92 is tilted by adequately operating the screws 931 so that the DVD media is irradiated with laser light emitted from the objective lens 4, with the optical axis thereof perpendicular to the DVD media. Subsequently, an adhesive Be is applied to the side surfaces of the base 91 and the act base 92, whereby the act base 92 is fixed to the base 91. In this manner, the optical head B can be manufactured.

The collimating lens 3 fitted to the base 91 and the objective lens 4 included in the act base 92 are generally so formed as to be arranged vertically one on another at position where laser light is shined. However, when the relative position between the collimating lens 3 and the objective lens 4 exceeds the permitted range due to deformation at manufacturing or the like, the screws 93 (930, 931), and the recession 911 and the projections 921 may not be arranged at respective positions within the permitted ranges since they cannot be largely shifted.

Figure 9:
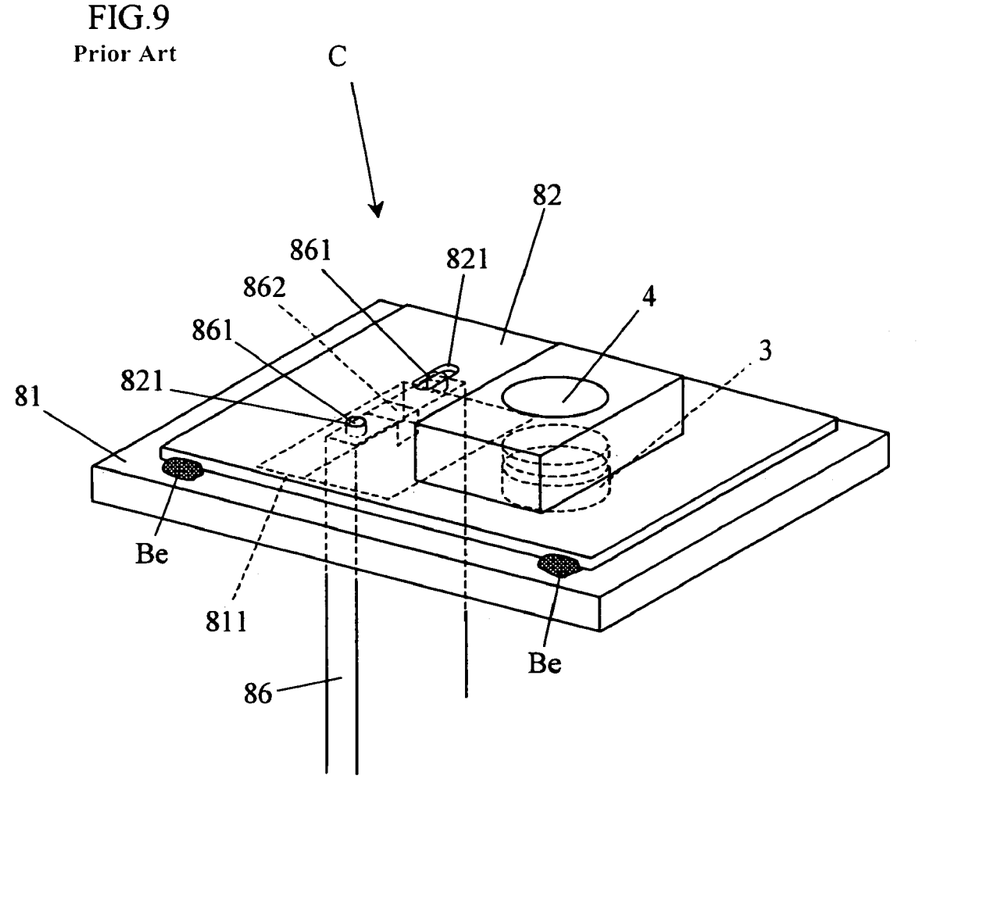
FIG. 9 is a perspective view of the conventional optical head.

Thus, a three-dimensional bonding method as shown in FIG. 9 may be adopted. An optical head C shown in FIG. 9 has a through hole 811 in a base 81. A positioning member 86 penetrating through this through hole 811 is used for positioning. The positioning member 86 is formed in a rectangular parallelepiped shape, having on the top thereof two projections 861 formed in a cylindrical shape with a magnet 862 in between. In the act base 82, locking holes 821 are formed at position in correspondence with the projections 861. The positioning member 86 is penetrated through the through hole 811, then the projections 861 of the positioning member 861 are put into engagement with the locking holes 821 of the act base 82, and then the positioning member 86 and the act base 82 are firmly connected together.

Subsequently, the positioning member 86 is moved horizontally to move the act base 82 so that the objective lens 4 arranged on the act base 82 is located at such a position as to appropriately receive laser light emerging from the collimating lens 3 fitted to the base 81. Further, moving the positioning member 86 makes adjustment so that the DVD media is irradiated with the laser light emerging from the objective lens 4, with the optical axis thereof perpendicular to the DVD media. Subsequently, upon completion of this adjustment, the adhesive Be is applied to the side surfaces of the base 81 and the act base 82, whereby the act base 82 is fixed to the base 81.

The invention as described in JP-A-2002-42373 refers to a method of fixing a stator part of an actuator to a frame by inserting a fixing projection through a fixing through hole with an adhesive.

However, bonding by use of the spherical recession 911 and the projections 921, the screws 93 (930, 931), and the spring 94 cannot support a case where the collimating lens 3 and the objective lens 4 are largely dislocated from the designed arrangement position. In case of adjustment made by the screws 93 (930, 931), small adjustment is difficult and the screws 93 (930, 931) cannot be detached after the adjustment; thus, a larger number of components is required accordingly. Moreover, it is difficult to evenly apply the adhesive Be or the like.

With the method shown in FIG. 9, the position where the act base 82 is to be arranged is determined by use of the positioning member 86, and the act base 82 and the base 81 are bonded together with the adhesive Be. In this operation, when it is difficult to apply the adhesive Be or the like evenly to different spots and thus it is not evenly applied, a biased stress is imposed on the act base 82 under shrinkage of the adhesive Be or the like. Under influence of this biased stress, the act base 82 moves to a position not determined by the positioning member 86 or is so fixed as to be deformed, thereby leading to performance degradation of the optical head.

The invention as described in JP-A-2002-42373 discloses a method of inserting a fixing projection through a fixing through hole and then fixing them with an adhesive. However, this provides a structure such that the adhesive tends to flow out of the gap between the fixing projection and the fixing through hole, so that unequal stress is possibly generated due to adhesive condensation.

SUMMARY OF THE INVENTION

In view of the problem described above, the present invention has been made, and it is an object of the invention to provide an optical head that achieves a higher accuracy in bonding between a base on which a collimating lens is arranged and an act base on which an objective lens is arranged, and that is capable of irradiating an optical disc with laser light of a stable intensity, thereby suppressing failure involved in data recording or reading. The present invention also relates to an optical disc device adopting such an optical head.

To achieve the object described above, according to one aspect of the present invention, an optical disc device which irradiates a discoid optical disc in rotation with laser light to thereby perform data recording or reading includes an optical head for irradiating the optical disc with laser light, wherein the optical head includes: a laser light source for emitting laser light; a mirror for reflecting the laser light emitted from the laser light source; a collimating lens for converting the laser light reflected by the mirror into parallel light; a base for supporting the collimating lens; an objective lens for irradiating the optical disc with the laser light; an act base for supporting the objective lens; and a light receiving element for receiving the light reflected on the optical disc. In act base, a plurality of through holes to engage with the base are formed in symmetry. In the base, projection are formed at positions in correspondence with the through holes of the act base in a stepped manner. The act base is adjusted so that the tilt angles of the objective lens and the optical disc fall within predetermined ranges, the through holes are engaged with the projections of the base, and an adhesive is injected to the through holes, thereby fixing the act base and the base together.

According to this configuration, in connecting and fixing the base and the act base together, the projections of the base are engaged with the through holes of the act base and then an adhesive is applied to the through holes. Therefore, the same amount of the adhesive is applied to the through holes.

Consequently, this permits preventing an unnecessary, uneven stress from being generated in the act base by shrinkage when the adhesive becomes dry. The prevention of an uneven stress in turn permits preventing a shift in the positional relationship between the base and the act base determined before bonding. Moreover, since no uneven stress is imposed on the act base, the deformation of the act base itself can be prevented. Further, the capability of irradiating the optical disc with optimum laser light permits stable data recording or reading.

To achieve the object described above, according to another aspect of the invention, an optical disc device, which irradiates a discoid optical disc in rotation with laser light to thereby perform data recording or reading, includes an optical head for irradiating the optical disc with laser light, wherein the optical head includes: a laser light source for emitting laser light; a mirror for reflecting the laser light; a collimating lens for converting the laser light into parallel light; an objective lens for irradiating the optical disc with the laser light; a beam splitter for splitting the light reflected on the optical disc; and a light receiving element for receiving the light. The collimating lens is supported by a base. The objective lens is supported by an act base. In four corners of the act base, through holes to engage with the base are formed. In the base, projections are formed at positions in correspondence with the through holes of the act base in a stepped manner by coupling together a first cylinder of a larger diameter and a second cylinder of a smaller diameter. In a portion of the first cylinder coupling with the second cylinder, a recessed groove is formed around the second cylinder. The act base is adjusted so that the tilt angles of the objective lens and the optical disc falls within predetermined ranges, the through holes are engaged with the projections of the base, and an adhesive is injected to the through holes, thereby fixing the act base and the base together.

According to this configuration, in connecting and fixing the base and the act base together, the adhesive stays in the through hole of the act base and in the recessed groove of the projections of the base, thereby making it difficult for the adhesive to flow out of the projections.

Consequently, this permits preventing an unnecessary, uneven stress from being generated in the act base by shrinkage when the adhesive becomes dry. The prevention of an uneven stress in turn permits preventing a shift in the positional relationship between the base and the act base determined before bonding. Moreover, since no uneven stress is imposed on the act base, the deformation of the act base itself can be prevented. Further, the capability of irradiating the optical disc with optimum laser light permits stable data recording or reading.

To achieve the object described above, according to still another aspect of the present invention, an optical disc device which irradiates a discoid optical disc in rotation with laser light to thereby perform data recording or reading includes an optical head for irradiating the optical disc with laser light, wherein the optical head includes: a laser light source for emitting laser light; a mirror for reflecting the laser light emitted from the laser light source; a collimating lens for converting the laser light reflected by the mirror into parallel light; a base for supporting the collimating lens; an objective lens for irradiating the optical disc with the laser light; an act base for supporting the objective lens; and a light receiving element for receiving the light reflected on the optical disc. In four corners of the act base, through holes to engage with the base are formed. In the base, projections are formed at positions in correspondence with the through holes of the act base in a stepped manner by coupling together cylinders of different diameters. The act base is adjusted so that the tilt angles of the objective lens and the optical disc falls within predetermined ranges, the through holes are engaged with the projections of the base, and an adhesive is injected to the through holes, thereby fixing the act base and the base together.

According to this configuration, the through holes are formed in the four corners of the act base, and the amount of adhesive injected is constant. Thus, the act base hardly become tilted or deformed due to a stress generated by shrinkage when the adhesive becomes dry. Moreover, the projection is formed on the base by coupling together the cylinders of different diameters, thereby making it easier to manufacture.

To achieve the object described above, according to still another aspect of the invention, an optical head includes: a laser light source for emitting laser light; a mirror for reflecting the laser light emitted from the laser light source; a collimating lens for converting the laser light reflected by the mirror into parallel light; a base for supporting the collimating lens; an objective lens for irradiating the optical disc with the laser light; an act base for supporting the objective lens; and a light receiving element for receiving the light reflected on the optical disc. In act base, a plurality of through holes to engage with the base are formed in symmetry. In the base, projections are formed at positions in correspondence with the through holes of the act base in a stepped manner. The act base is adjusted so that the tilt angles of the objective lens and the optical disc falls within predetermined ranges, the through holes are engaged with the projections of the base, and an adhesive is injected to the through holes, thereby fixing the act base and the projections together.

According to this configuration, in connecting and fixing the base and the act base together, the projections of the base are engaged with the through holes of the act base and then the adhesive is applied to the through holes. Therefore, the same amount of the adhesive is applied to the through holes.

Consequently, this permits preventing an unnecessary, uneven stress from being generated in the act base by shrinkage when the adhesive becomes dry. The prevention of an uneven stress in turn permits preventing a shift in the positional relationship, determined before bonding, between the base and the act base. Moreover, since no uneven stress is imposed on the act base, the deformation of the act base itself can be prevented. Further, the capability of irradiating the optical disc with optimum laser light permits stable data recording or reading.

In the configuration described above, the through holes of the act base may be formed at four or substantially four corners of the act base. The projection of the base can be exemplified by the one formed by coupling together cylinders of different diameters, but the shape thereof is not limited to this. Alternatively, the projection may be formed by coupling together cylindrical members having different cross sections. Moreover, a wide variety of members may be used which are capable of engaging with the through hole of the act base, including those sharp-pointed such as cones, pyramids, and like, those having a tapered inclination, and the like.

Further, a coupling part of the projection has a recessed groove formed therearound where one of the cylinders of the larger diameter couples with another of the cylinders. The recessed grooves may be widely used which makes it easy for the adhesive to flow, including those having a cross section of a circular arc, an oval, a rectangle, and the like.

BRIEF DESCRIPTION OF THE DRAWINGS

The above and other objects of the present invention will be more clarified with reference to the preferred embodiments to be described below and the accompanying drawings showing the following.

DESCRIPTION OF THE PREFERRED EMBODIMENTS

Figure 1:
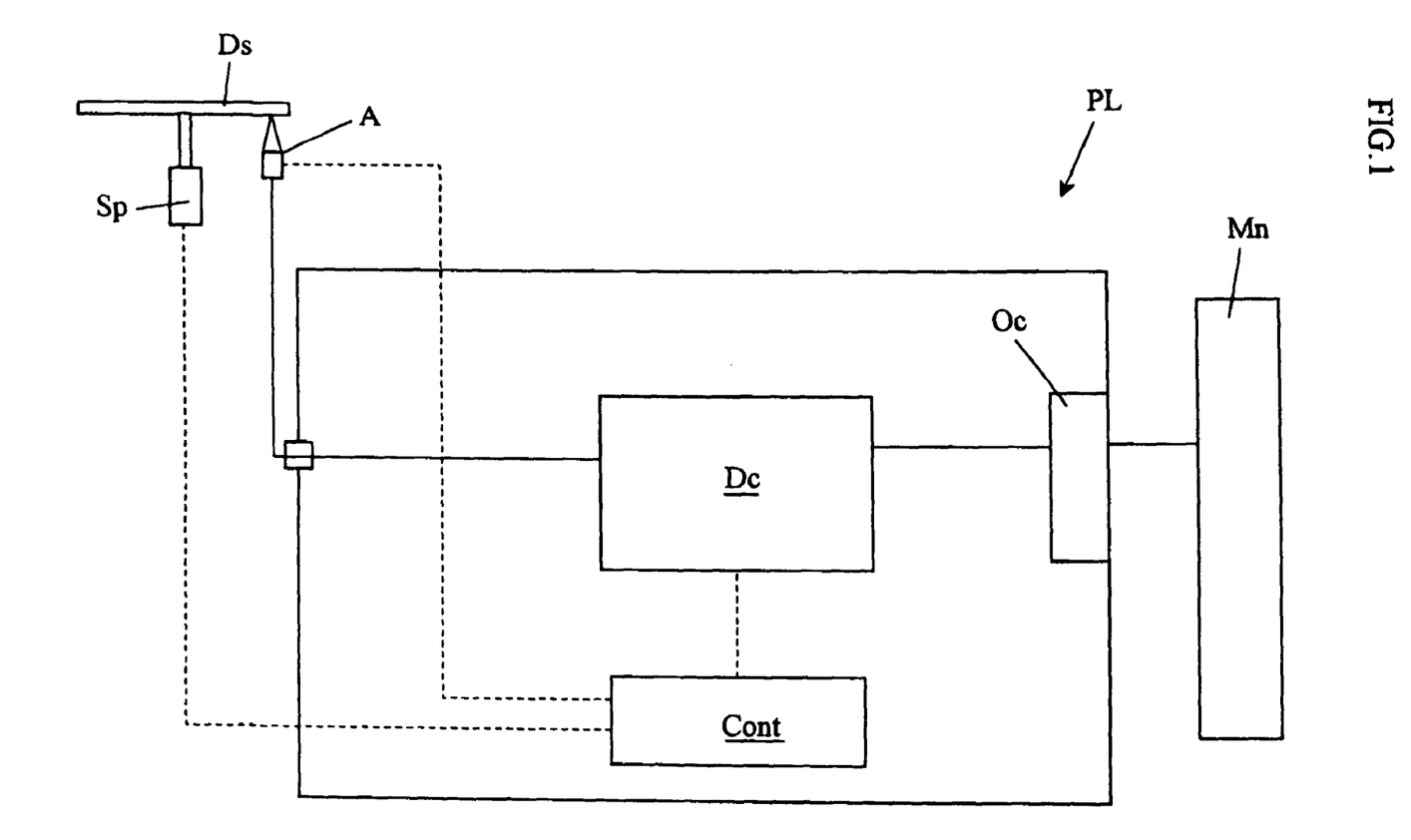
FIG. 1 is a layout drawing of an optical disc device according to the present invention.

Hereinafter, the embodiment of the present invention will be described with reference to the accompanying drawings. FIG. 1 is a layout drawing of an optical disc device according to the present invention. The optical disc device shown in FIG. 1 is, but not limited to, a DVD player in this embodiment. The DVD player PL shown in FIG. 1 has substantially the same structure as that of the conventional DVD player PM. That is, the DVD player PL includes: a spindle motor Sp that rotates a DVD media Ds; an optical head A that irradiates the DVD media Ds with light and then reads information therefrom; a decoder Dc that decodes a signal detected by the optical head A; an external connector Oc that makes connection with a monitor Mn provided as an external display device; and a controller Cont.

The DVD player PL is controlled by the controller Cont. Upon command from the user for reproducing the DVD, the spindle motor Sp is first driven to thereby rotate the DVD media Ds. The optical head A irradiates the DVD media Ds in rotation with laser light, and then detects the light reflected therefrom. A light receiving element Pd, to be described below, included in the optical head A converts the detected light into an electrical signal, which is transmitted to the decoder Dc, where the signal is demodulated into a picture signal and then transmitted to the monitor Mn through the external connector Oc, whereby the picture is displayed on the monitor Mn FIG. 2 shows a layout drawing of one example of the optical head. More specifically, the optical head has a laser light source Ld, a mirror Mr, a collimating lens 3, an objective lens 4, a beam splitter Bs, and the light receiving element Pd. Laser light emitted from the laser light source Ld is reflected on the mirror Mr, enters the collimating lens 3, transforms into parallel light, and then emerge from the objective lens 4, to be thereby irradiated to the DVD media Ds.

At this point, the laser light is irradiated, focusing on a recording layer of the DVD media Ds, so that the optical axis and the recording layer of the DVD media Ds become perpendicular to each other. The beam splitter Bs is a prism that transmits half of incident laser light therethrough and reflects half of the incident laser light and that guides light reflected on the DVD media Ds to the light receiving element Pd. The light receiving element Pd converts light into a current, and reads data based on the intensity of light.

Figure 3:
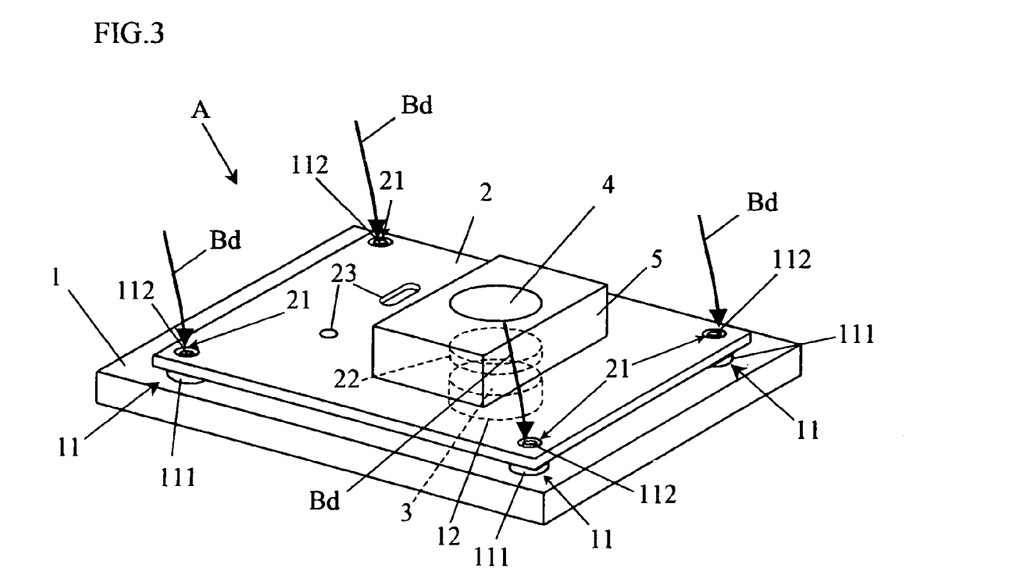
FIG. 3 is a perspective view of an optical head according to the present invention.
Figure 4:
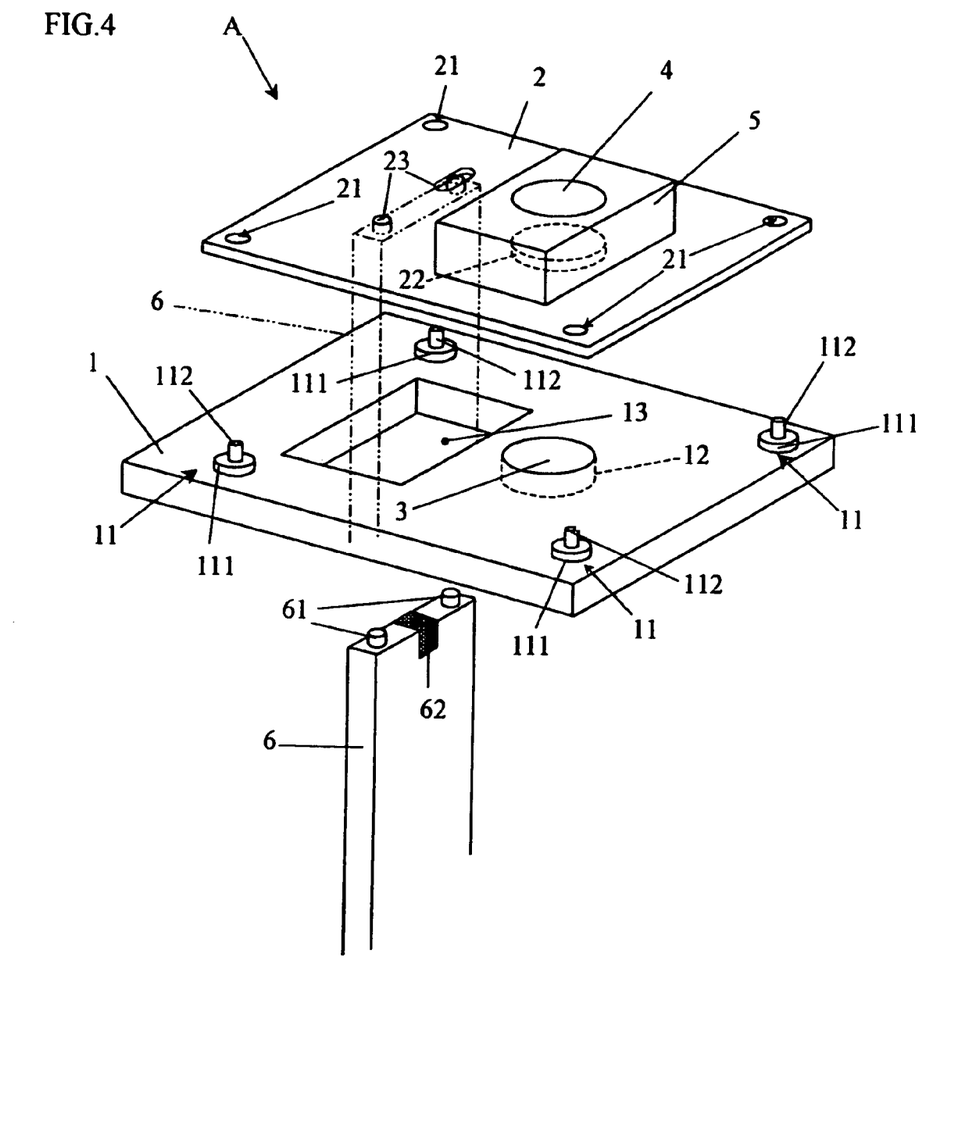
FIG. 4 is an exploded perspective view of the optical head shown in FIG. 3.

FIG. 3 is a perspective view of the optical head according to the present invention, and FIG. 4 is an exploded perspective view of the optical head shown in FIG. 3. As shown in FIG. 3, the optical head A has a base 1 for supporting the collimating lens 3, and an actuator base 2 for supporting the objective lens 4 which actuator base is fitted to the base 1. The act base 2 is formed in, but not limited to, a rectangular shape with through holes 21 formed in the four corners thereof. The base 1 has, on the position thereof corresponding to the through holes 21 when the act base 2 is arranged on the base 1, projections 11 to engage with the respective through holes 21. With the through holes 21 of the act base 2 engaged with the respective projections 11 of the base 1, an adhesive Bd is filled to the through holes 21 to thereby fix the act base 2 to the base 1.

As shown in FIG. 4, in the base 1, there is formed a lens fitting hole 12 for fitting the collimating lens 3. Next to the lens fitting holes 12, a positioning hole 13 is formed in a rectangular shape.

Figure 10:
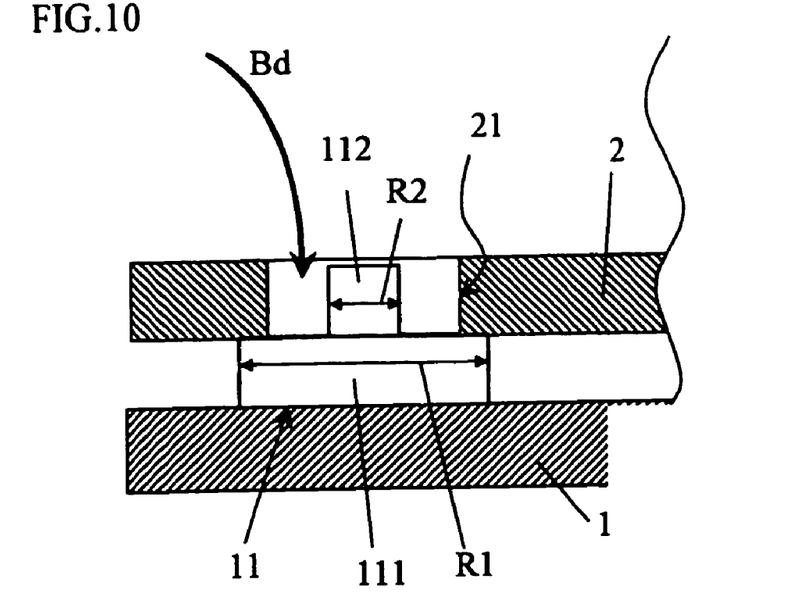
FIG. 10 is an enlarged sectional view of one example of a projection provided in the optical head shown in FIG. 3.

FIG. 10 is an enlarged sectional view of one example of the projection provided on the optical head shown in FIG. 3 or 4. The projection 11 shown in FIG. 10 is formed by combining two cylinders of different diameters, in such a manner that the second projection 112 having a smaller diameter R2 is arranged vertically one on another on the first projection 111 having a larger diameter R1 with the central axes thereof in agreement with each other. The first projection 111 is formed in a cylindrical shape having an outer diameter slightly larger than the inner diameter of the through hole 21 of the act base 2.

In the act base 2, there are formed: the lens fitting part 5 for fitting the objective lens 4 and a light passage hole 22 penetrating through the act base 2 for making laser light from the collimating lens 3 incident on the objective lens 4. Next to the light passage hole 22, an engagement part 23, to be described below, for engaging a positioning member 6 is formed. The positioning member 6 has a rectangular parallelepiped shape with a top thereof provided with two engaging projections 61 to engage with the engagement part 23 of the act base 2. The engaging projections 61 each have a columnar shape. Between the adjacent engaging projections 61, a magnet 62 is arranged. The positioning member 6 engages the engaging projections 61 to the engagement part 23 of the act base 2 and also holds the act base 2 with the magnetic force of the magnet 62.

Figure 5:
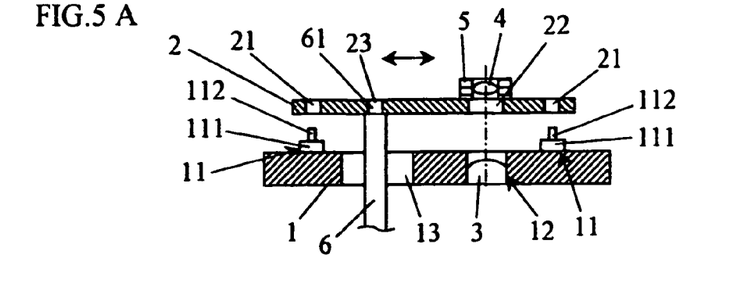
FIG. 5A to FIG. 5D are sectional views of process of manufacturing the optical head according to the present invention.

In FIGS. 5A to 5D, sectional views are provided showing process of manufacturing the optical head according to the present invention. In FIGS. 5A to 5D, the direction along the paper surface indicated by the arrow denotes the movement direction. Three-dimensionally speaking, the movement is actually also possible in the direction separating from the paper surface. As shown in FIG. 5A, the base 1 is horizontally arranged, and then the act base 2 is arranged on the top of the base 1 with the through holes 21 thereof located in correspondence with the respective projections 11 of the base 1. Subsequently, the positioning member 6 is inserted through the positioning hole 13 of the base 1, and the positioning member 6 and the act base 2 are coupled together. As shown in FIGS. 5A to 5D, the positioning member 6 is moved to provide a predetermined positional relationship between the collimating lens 3 fitted to the base 1 and the objective lens 4 mounted on the act base 2.

In this condition, the positioning member 6 is moved, with the act base 2 kept in parallel with the base 1. The positioning member 6 is movable horizontally within such a range that the second projections 112 formed in the base 1 can engage with the respective through holes 21 of the act base 2 and is also movable in the height direction. After arranging the act base 2 on the top of the base 1 by the positioning member 6, the positioning member 6 is further moved to swing the act base 2 so that laser light emitted from the objective lens 4 is irradiated to the DVD media Ds at a predetermined angle (with the optical axis perpendicular to the media Ds in this embodiment). In this operation, the positioning member 6 is moved so that the arrangement position of the objective lens 4 is not changed, i.e., the act base 2 swings about the objective lens 4 (see FIG. 2).

After the positioning of the act base 2, the position of the positioning member 6 is fixed. Then, after confirming that the second projections 112 of the base 1 are in engagement with the respective through holes 21 of the act base 2, the adhesive Bd is injected (see FIG. 5C). After the injection of the adhesive, the positioning member 6 is fixed at the position of FIG. 5C until the adhesive Bd becomes dry, and when the adhesive Bd has become dry, the positioning member 6 is removed, thereby completing the fitting operation (see FIG. 5D).

The through holes 21 formed in the act base 2 all have the same shape and the same size, and the second projections 112 formed on the base 1 all have the same shape and the same size. Since the act base 2 is arranged in parallel to or slightly at a tilt to the base 1, the second projections 112 engage with the respective through holes 21, and the same or substantially the same amount of the adhesive Bd is injected to each of the through holes 21. Therefore, the stress, which is generated by shrinkage when the adhesive Bd is injected to the through holes 21 becomes dry to be thereby solidified, is evenly applied to the act base 2, thus permitting preventing occurrence of problems such as movement, deformation, and the like.

Figure 11:
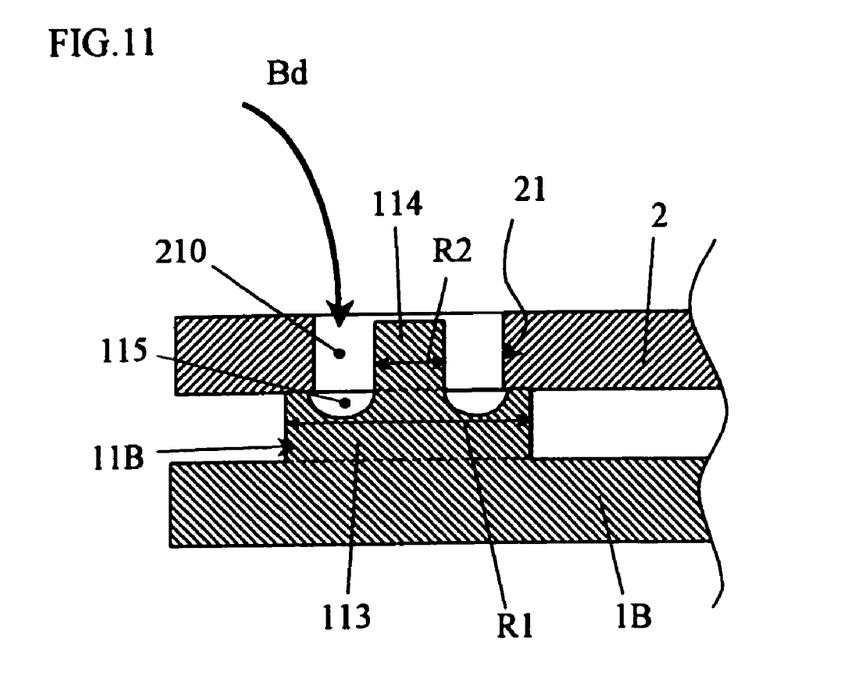
FIG. 11 is an enlarged sectional view of another example of the projection shown in FIG. 10.

FIG. 11 is an enlarged sectional view of another example of the projection shown in FIG. 10. The projection shown in FIG. 11 has the same shape as that of the projection shown in FIG. 10 with only different in that the first projection has a recessed groove, and thus the same portions are provided with the same numerals as used in FIG. 10. The projection 11B shown in FIG. 11 has a first projection 113 of a large diameter R1 which is integrally formed with the base 1B, and a second projection 114 of a small diameter R2 which is integrally formed with the first projection 113. The first projection 113 and the second projection 114 are so formed as to be coaxially coupled together.

In the surface of the first projection 113 which is coupled with the second projection 114, the recessed groove 115 is so formed as to surround the portion coupling with the second projection 114. The recessed groove 115 is formed larger than the inner diameter of the through hole 21 in the act base 2.

In fitting the act base 2 to the base 1B, after adjusting the tilt of the act base 2, the arrangement is achieved so that the projection 11B of the base 1B is inserted in the through hole 21 of the act base 2. After the projection 11B is inserted in the through hole 21, the adhesive Bd is injected to the through hole 21 from thereabove.

The adhesive Bd injected to the through hole 21 flows into the recessed groove 115 formed in first projection 113 of the projection 11B, whereby the adhesive Bd stays in a space 210 formed by the projection 11B and the through hole 21, thereby suppressing the adhesive Bd from dropping from the side surface of the first projection 113.

This therefore permits achieving substantially the same adhesion state of the adhesive Bd in all the through holes 21 formed in the act base 2. Thus, the stress, which is generated by shrinkage when the adhesive Bd becomes dry to be thereby solidified, is evenly applied to the act base 2, thereby permitting preventing occurrence of problems such as movement, deformation, and the like.

In the embodiment described above, the act base 2 is illustrated which has a rectangular shape with the through holes 21 provided in the four corners thereof. However, the shape of the act base 2 is not limited to this, and thus any shape can be widely used which does not cause any problems when arranged on the base. Moreover, in this condition, an act base can be widely adopted which includes a plurality of through holes located at position that permits supporting the load applied to the act base in a balanced and divided manner.

In the embodiment described above, an example of the projection 11 of the base 1 is exemplified by the one which is formed by coupling together the cylindrical first projection 111 and second projection 112 of different diameters, but the projection 11 is not limited to this example. For example, the first projection and the second projection may have different cross sections, and thus the second projection may be adopted which is formed in a sharp-pointed conical shape, a tapered shape, or the like, that can be easily inserted in the through hole 21. Thus, the second projection can be widely adopted which is capable of providing a stable bonding area when the adhesive Bd is injected to the through hole 21.

According to the present invention described above referring to the embodiment, an optical head and an optical disc device employing this optical head can be provided which are capable of improving the accuracy in bonding between a base on which a collimating lens is arranged and an act base on which an objective lens is arranged and which are capable of irradiating an optical disc with laser light of a stable intensity accordingly, thereby suppressing failure in data recording or reading.

What is claimed is:

1. An optical head comprising:
a laser light source for emitting laser light;
a mirror for reflecting the laser light;
a collimating lens for converting the laser light into parallel light;
an objective lens for irradiating an optical disc with the laser light;
a beam splitter for splitting the light reflected on the optical disc; and
a light receiving element for receiving the light,
wherein
the collimating lens is supported by a base,
the objective lens is supported by an actuator base (act base),
in the act base, a plurality of through holes to engage with the base are so formed as to be in symmetry,
in the base, projections are formed at positions in correspondence with the through holes of the act base in a stepped manner by coupling together a first cylinder of a larger diameter and a second cylinder of a small diameter,
in a surface of the first cylinder coupling with the second cylinder, a recessed groove is formed so as to surround a portion of the first cylinder coupling with the second cylinder, and
the act base is adjusted so that tilt angles of the objective lens and the optical disc fall within predetermined ranges, the through holes are engaged with the projections of the base, and an adhesive is injected to the through holes, thereby fixing the act base and the projections together.

2. The optical head according to claim 1, wherein the through holes of the act base are formed at four corners of the act base.

3. The optical head according to claim 1, wherein the projections of the base are formed by coupling together cylinders of different diameters.

4. The optical head according to claim 1, wherein the recessed groove is formed larger than an inner diameter of the through holes.

5. An optical disc device, wherein
a discoid optical disc in rotation is irradiated with laser light to thereby perform data recording or reading, and
the optical head according to claim 1 is included which irradiates the optical disc with laser light.

6. An optical disc device, which irradiates a discoid optical disc in rotation with laser light to thereby perform data recording or reading,
the optical disc device comprising an optical head for irradiating the optical disc with laser light,
wherein
the optical head comprises:
a laser light source for emitting laser light;
a mirror for reflecting the laser light;
a collimating lens for converting the laser light into parallel light;
an objective lens for irradiating the optical disc with the laser light;
a beam splitter for splitting the light reflected on the optical disc; and
a light receiving element for receiving the light,
the collimating lens is supported by a base,
the objective lens is supported by an actuator base (act base),
in four corners of the act base, through holes to engage with the base are formed,
in the base, projections are formed at positions in correspondence with the through holes of the act base in a stepped manner by coupling together a first cylinder of a larger diameter and a second cylinder of a smaller diameter,
in a surface of the first cylinder coupling with the second cylinder, a recessed groove is formed so as to surround a portion of the first cylinder coupling with the second cylinder, and
the act base is adjusted so that tilt angles of the objective lens and the optical disc fall within predetermined ranges, the through holes are engaged with the projections of the base, and an adhesive is injected to the through holes, thereby fixing the act base and the base together.

* * * * *